US010579988B2

(12) United States Patent
Betancourt et al.

(10) Patent No.: US 10,579,988 B2
(45) Date of Patent: Mar. 3, 2020

(54) IN-VEHICLE DATA ENTRY

(71) Applicant: Epona, LLC, Franklin, TN (US)

(72) Inventors: Ernest Betancourt, Lascassas, TN (US); Vince Peschio, Brentwood, TN (US)

(73) Assignee: Epona LLC, Franklin, TN (US)

( * ) Notice: Subject to any disclaimer, the term of this patent is extended or adjusted under 35 U.S.C. 154(b) by 703 days.

(21) Appl. No.: 14/739,683

(22) Filed: Jun. 15, 2015

(65) Prior Publication Data

US 2016/0364718 A1    Dec. 15, 2016

(51) Int. Cl.
*G06Q 20/32*     (2012.01)
*G07F 13/02*     (2006.01)

(52) U.S. Cl.
CPC ......... *G06Q 20/3278* (2013.01); *G06Q 20/32* (2013.01); *G06Q 20/3224* (2013.01); *G07F 13/025* (2013.01)

(58) Field of Classification Search
CPC ..................................................... G06Q 20/32
USPC .......................................................... 705/44
See application file for complete search history.

(56) References Cited

U.S. PATENT DOCUMENTS

| 2008/0014947 | A1* | 1/2008 | Carnall | G08B 21/22 455/437 |
| 2008/0208701 | A1* | 8/2008 | Betancourt | G06Q 10/02 705/5 |
| 2010/0088127 | A1* | 4/2010 | Betancourt | G06Q 10/02 705/5 |
| 2014/0006188 | A1* | 1/2014 | Grigg | G06Q 20/20 705/17 |

* cited by examiner

*Primary Examiner* — Robert R Niquette
*Assistant Examiner* — Liz P Nguyen
(74) *Attorney, Agent, or Firm* — Banner & Witcoff, Ltd.

(57) ABSTRACT

A transaction system may receive transaction information for a fueling transaction that includes input data from a communication device in the vehicle. Upon detecting the presence of a wireless device of the vehicle in a predefined wireless service area of a service station, the service station may read the wireless device and may transmit the fuel stop information and to the transaction system. The transaction system may determine if the fuel stop information corresponds to the transaction information and if the fueling transaction is authorized. Upon determining that the fueling transaction is authorized, a transaction authorization indication may be transmitted to the service station and the service station may activate a fuel dispenser system to dispense fuel into the vehicle.

16 Claims, 6 Drawing Sheets

IN-VEHICLE DATA ENTRY

TECHNICAL FIELD

Aspects described herein generally relate to data entry systems for fueling vehicles. More specifically, aspects relate to processing vehicle transactions using a communication device located in the vehicle.

BACKGROUND

Fueling of commercial vehicles is a relatively specialized process which may often be time-consuming. In many instances, commercial fuel lanes might only be able to accommodate one truck at a time. Vehicle-based radio frequency identification (RFID) tag systems may be deployed to increase efficiency and throughput of a fueling station. In such systems, tag readers are positioned at each fueling pump of a service station and read vehicle information from tags on or in vehicles that approach the pump for refueling. However, the pumps and service stations at which the tag readers are deployed must be designed to ensure that an RFID tag associated with a first vehicle is not inadvertently read during the fueling operation of a second vehicle, resulting in an erroneous assignment of the second vehicle's fuel cost to the first vehicle's tag.

Commercial fuel systems also have a specialized nature because the driver acts as an agent for the actual purchaser, such as a trucking fleet or carrier. Additionally, the amount of time spent refueling transportation vehicles has a large impact on the cost of transportation, both for vehicle owners and service station owners and operators. Refueling time may vary greatly depending on a variety of factors including required processing time for a fuel sale and/or transaction.

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the description below.

According to one or more aspects described herein, a communication device inside or near a vehicle can send user input data wirelessly to a transaction system, while service station information may be transmitted separately from the fuel station. In one arrangement, the transaction system may receive transaction information for a fueling transaction, where the transaction information includes input data from a communication device associated with a driver or a vehicle. For example, the input data may include at least one of: driver identification number, trip identification number, truck identification number, license number, load identification number, loyalty card information, odometer reading, trip number or trailer identification number, and payment information. A service station, on the other hand, may read the information from a wireless device, e.g., a wireless tag in response to detecting the wireless device in a predefined wireless service area, and transmit fuel stop information to the transaction system. The transaction system may determine if the fuel stop information corresponds to transaction information (e.g., sent separately from the vehicle or driver) and determine authorization of the fueling transaction. The service station and/or the communication device may receive a transaction authorization indication in response to the transaction system determining authorization of the fueling transaction and, upon receiving the authorization indication, the service station may activate a fuel dispenser system to dispense fuel into the vehicle.

These as well as other advantages and aspects are apparent and understood from the following detailed description, the attached claims, and the accompanying drawings.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
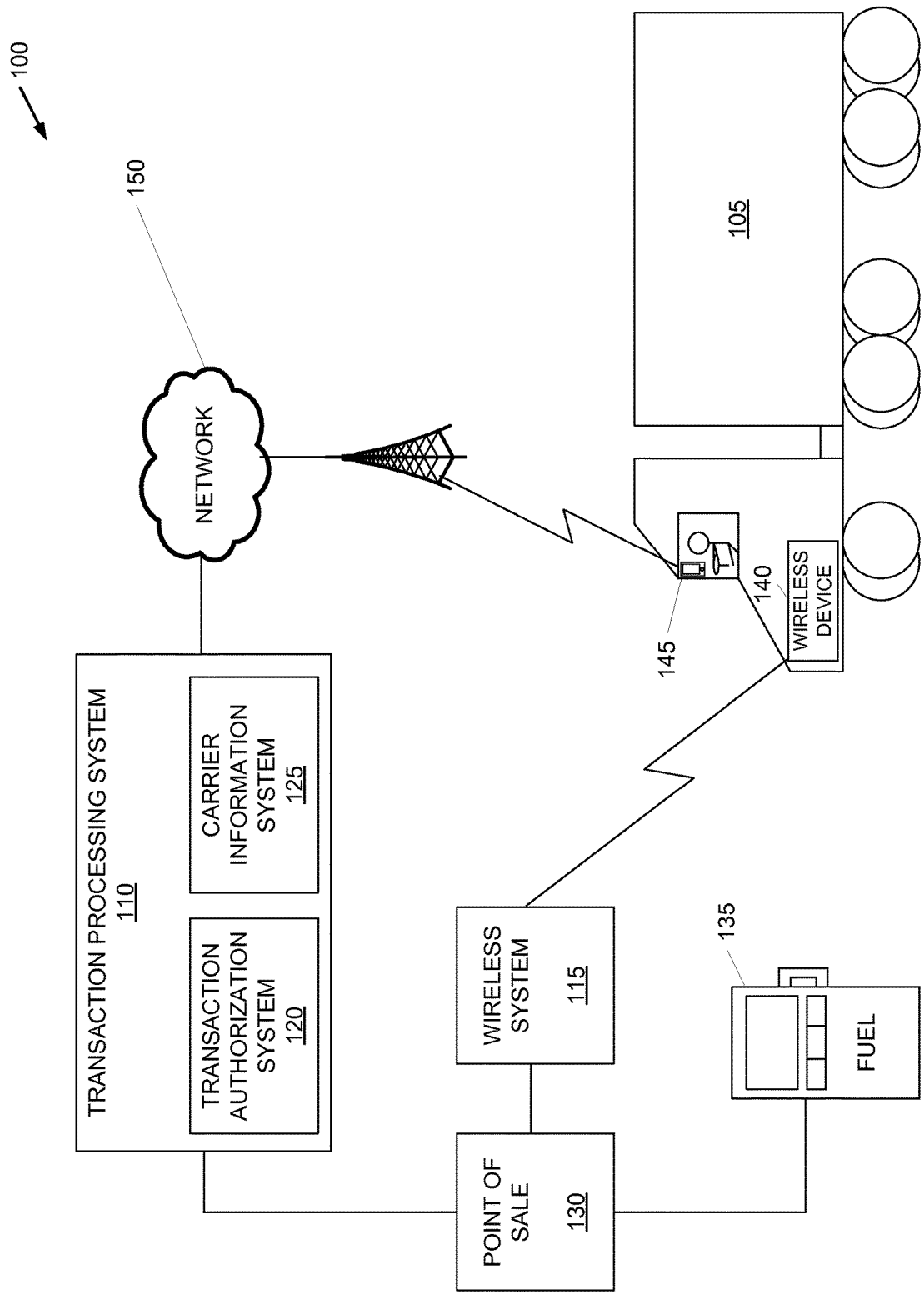
FIG. 1 illustrates a transaction authorization and processing system according to one or more aspects described herein.

FIG. 1 illustrates an example of a transaction processing and authorization system 100 configured to function with transportation vehicles such as a truck 105. While a truck 105 is described as the transportation vehicle in this example, the aspects described herein may be applied to a variety of different vehicles. Truck 105 may be a tractor, a tractor-trailer unit, a straight truck, a trailer, or other similar commercial transport vehicle requiring fuel. Fuel for the vehicle may include any unit required by the vehicle which may be dispensed at a service station, including, but not limited to, diesel fuel, natural gas (compressed or liquid), diesel exhaust fluid, bio-diesel, and the like.

Generally, the transaction for a transportation vehicle may be between a service station, such as a fuel service station and the carrier or owner of the truck 105 since the driver is typically an agent of the carrier or owner. To streamline and facilitate the process, the system 100 may provide the driver with the convenience of entering transaction information or identification information from within the vehicle, and the ease of using a device which is more suited to entry of information. Other transaction information typically provided by the service station may be provided by the service station without requiring the user to interact with service station systems such as fuel pump or other data entry device.

In one example, the driver may initiate a transaction by entering input data into a communication device 145 while the driver remains in the cab or in another location of the truck 105. The input data may include various data elements that carriers require to be entered prior to authorizing a fueling transaction, such as, but not limited to driver identification number, trip identification number, truck identification number, license number, load identification number (e.g., dispatch number, load number, order number), loyalty card information, odometer reading, trip number, trailer identification number, and payment information. In some arrangements, the driver is not required to exit the cab of the vehicle and can enter information for transaction authorization away from the point of sale (e.g., a fuel station/pump) because the communication device 145 is configured to wirelessly transmit the input data from within the cab of the vehicle. Accordingly, the driver is able to enter the required data into the communication device 145 while sitting in the comfort of his or her own truck. In one example, the communication device 145 may be a device installed in the cab of the vehicle, such as a telemetry system configured with provisions for data entry for a fueling transaction. Where the communication device is installed in the truck 105, the data input system of the communication device may be associated with the specific truck in which it is installed and may store information specific to the truck, such a truck or a trailer identification number. Accordingly, the driver may only need to enter data specific to the driver, the trip and/or the particular transaction/fueling stop, to initiate a fueling transaction from the communication device. In some examples, the communication device 145 may be configured to store driver, vehicle and/or trailer related information for a predetermined amount of time, e.g., a duration of the trip, such that a driver is not required to enter all data for each refueling transaction. Alternatively or additionally, driver, vehicle and/or trailer information may be stored for an indefinite period of time.

Requests to the driver for additional transaction information may subsequently follow in prompt(s). For example, the communication device 145 may prompt the driver to enter initial transaction information by displaying a prompt or a transaction information request on a display screen of the communication device 145. Requests for information may be triggered by and/or sent from the transaction processing system. The initial transaction information requested may be information used in authenticating the driver and/or confirming that the driver is an authorized user or driver. The initial transaction information may include driver identification information such as driver's license information, biometric data (e.g., fingerprint, retina scan, etc.), vehicle identification information, load information, and route information. Additional transaction information may be general transaction-related information such as the transaction amount requested, payment method, and the type of items to be purchased.

In some examples, the communication device 145 may be a smart device, including but not limited to personal digital assistants (PDAs), mobile telephones, portable computers, tablets, or similar device with cellular data service. The communication device may be associated with the specific driver and store information specific to the driver, such as driver identification number or license number. In some examples, the communication device may be configured to store transaction information relating to the truck and/or the trailer for a predetermined amount of time, e.g., the duration of the trip. The communication device can also store driver-related loyalty identifications corresponding to loyalty programs associated with one or more service station. Moreover, by using a communication device in the cab of the truck 105 for initiating fueling transactions, rather than depending on the interfaces provided at the point of sale or the location of the point of sale, a driver may be able to customize the communication device 145 to any number of preferred settings, e.g., language, font size, interface setup, or the like. Such customization may further help to reduce time spent by drivers when entering input data each time they initiate a fueling transaction.

In some examples, the transaction and/or identification information required for transaction authorization may be provided using a combination of communication devices of the vehicle, infrastructure at a service station, and/or communication networks. The system 100 may include various facilities including a transaction processing system 110 comprising a transaction authorization system 120 and a carrier information system 125, wireless system 115 (e.g., radio frequency identification (RFID) system), point of sale 130, and fuel dispenser 135. The system 100 may further include a wireless device 140 such as an RFID tag, a transponder, magnetic stripe cards, chip cards, smart cards, and the like. The communication device 145 may also be within the general vicinity of the vehicle or within communication range with the wireless device 140. In some arrangements, the communication device 145 may be physically distinct from the wireless device 140. In other examples, the wireless device 140 may be configured to be inserted into or otherwise mounted in communication device 145. In a particular example, the wireless device 140 may be mounted on the vehicle.

Upon a driver entering input data into communication device 145, the transaction information associated with the input data may be transmitted to the transaction processing system 120 for authorization. In conjunction with the input data from the driver's communication device 145, data from the point of sale system or service station system may be separately transmitted to the transaction processing system 110. The point of sale or service station system may obtain and send relevant data upon detecting the wireless device 140 of the vehicle or driver upon entry into a service area. Accordingly, the vehicle/driver does not need to manually trigger the transmission of service station data to the transaction processing system. Based on the received data, the transaction processing system 110 may determine if the transaction information received can be matched with related trip information associated with the fleet carrier. Certain data may be stored in the transaction processing system 110 associated with a particular driver or truck identification number. Additionally, the transaction processing system 110 may also be configured to transmit a prompt to the communication device 145 requesting various additional data elements.

A transaction processing and authorization system 100 may include, in some examples, a system or infrastructure that supports communication with the communication device 145 in the vehicle to facilitate the process of authorizing and processing transactions. A point of sale 130 may include, in some examples, a system for processing transactions (e.g., authorizing and completing fuel sale transactions) on behalf of the provider of the services or goods. Point of sale systems may process different types of transactions using different types of authorization and payment methods.

The transaction processing system 110 may establish one wireless network connection with the communication device 145 in the truck 105 and/or with a driver thereof to send and receive transaction related information such as driver identification information, trip identification information, trailer identification information, truck identification information, license number, load identification information (e.g., dispatch number, load number, order number), loyalty card information, and payment information. For example, the transaction processing system 110 may establish a wireless network connection through network 150 with the communication device 145. The wireless network connection may include a wireless wide area network (WAN), satellite communication network, cellular network and/or wireless Local Area Network (LAN) such as Wi-Fi. The transaction processing system 110 may establish another wireless network connection with the fuel station 135 to receive other transaction data.

The transaction processing system 110 may include a transaction or fuel authorization system 120 and a carrier information system 125. The transaction processing system 110 may manage connections between the transaction authorization system 120 and the carrier information system 125 associated with truck 105. In particular, in one example, the transaction authorization system 120 may communicate with carrier information system 125 to access data stored therein and verify and authorize transaction requests. Additionally, in some arrangements, the transaction processing system 110 may be different from and/or located separately from carrier information system 125. For example, the transaction authorization system 120 may be located at or otherwise associated with the fueling station and in communication with the carrier information system through a wireless or wired communication connection over a network. The carrier information system 125, on the other hand, may be situated at a carrier location. The transaction authorization system 120 may also be located at the site of a third-party or under the same operator as the carrier information system 125.

Communications between the transaction processing system 110, carrier information system 125 and fuel station 135 may be conducted using a variety of communication methods including wired and wireless communication solutions. Wired connections, for example, may include local area networks (LANs), Internet Protocol (IP) networks, satellite communication networks, cable networks and/or fiber optic communication links. Wireless connections, for example, may include a wireless wide area network (WAN), satellite communication network, cellular network and/or wireless Local Area Network (LAN) such as Wi-Fi.

Carrier information system 125 may include a system, database and/or device corresponding to an organization or a company associated with truck 105 and/or the driver of truck 105. For example, carrier information system 125 may be operated by a carrier organization or company to which the truck 105 belongs and/or with which the driver is employed or otherwise engaged. In one or more instances, the organization or company may be a carrier or shipping company. The carrier information system 125 may include a database storing operations information. For example, a carrier information system 125 may store and maintain data relating to shipping routes, delivery times, truck and/or driver assignments, costs, driver information, budgets and the like. Additionally, the carrier information system 125 may provide this information to the transaction authorization system (e.g., of a fueling station or service provider) to be used by the transaction authorization system to determine whether a particular transaction request should be authorized. The carrier information system may also accept and process transaction authorization requests and determine whether these requests should be authorized based on information stored in the carrier information system 125. In another aspect, the carrier information system 125 may be used to authenticate the requestor or driver based on information stored in the carrier information system 125. Carrier information system 125 may further receive data and/or input from the communication device 145 relating to the truck 105, a driver, and/or a third party system such as a third-party transaction authorization system.

The wireless system 115 may be a RFID system including RFID readers and RFID tags. The RFID reader may be located at a service station or at a fuel station, and the wireless device 140 may be associated with or located on the truck 105 or other vehicle. The communication device 145 in the cab of the truck 105 may be capable of communicating with the wireless device 140. The communication device 145 may communicate with the wireless device 140 over a wired or wireless connection. For example, the communication device 145 may use a Bluetooth connection, near field communication (NFC) connection, infrared (IR), or Wi-Fi connection to communicate with the wireless device 140. The wireless device 140 and the communication device 145 may also communicate through wired interfaces. The communication device 145 may further be configured to communicate with other devices or systems such as the transaction processing system 110 and carrier information system 125 over a communication network such as a wireless wide area network (WAN), satellite communication network, cellular network and/or wireless Local Area Network (LAN) such as Wi-Fi. For a wired or physical connection, the communication device 145 may communicate with the wireless device 140 through a wired connection such as a cable having a physical communication interface compatible with the communication device 145. For example, the physical communication interface of the cable may be a serial type communication interface.

While the transaction processing system 110 and the point of sale 130 have been described and illustrated as two systems, these systems may also be implemented as a single system including the functionality of both systems. Similarly, the wireless system 115 may also be integrated with the point of sale 130. The point of sale 130 may be a fuel station 215 of the service station 205 or a cashier work station (not shown) of the service station 205. For example, the fuel station 215 may include a keypad and a display which the driver can use to enter additional transaction information and request authorization of a transaction.

Figure 2:
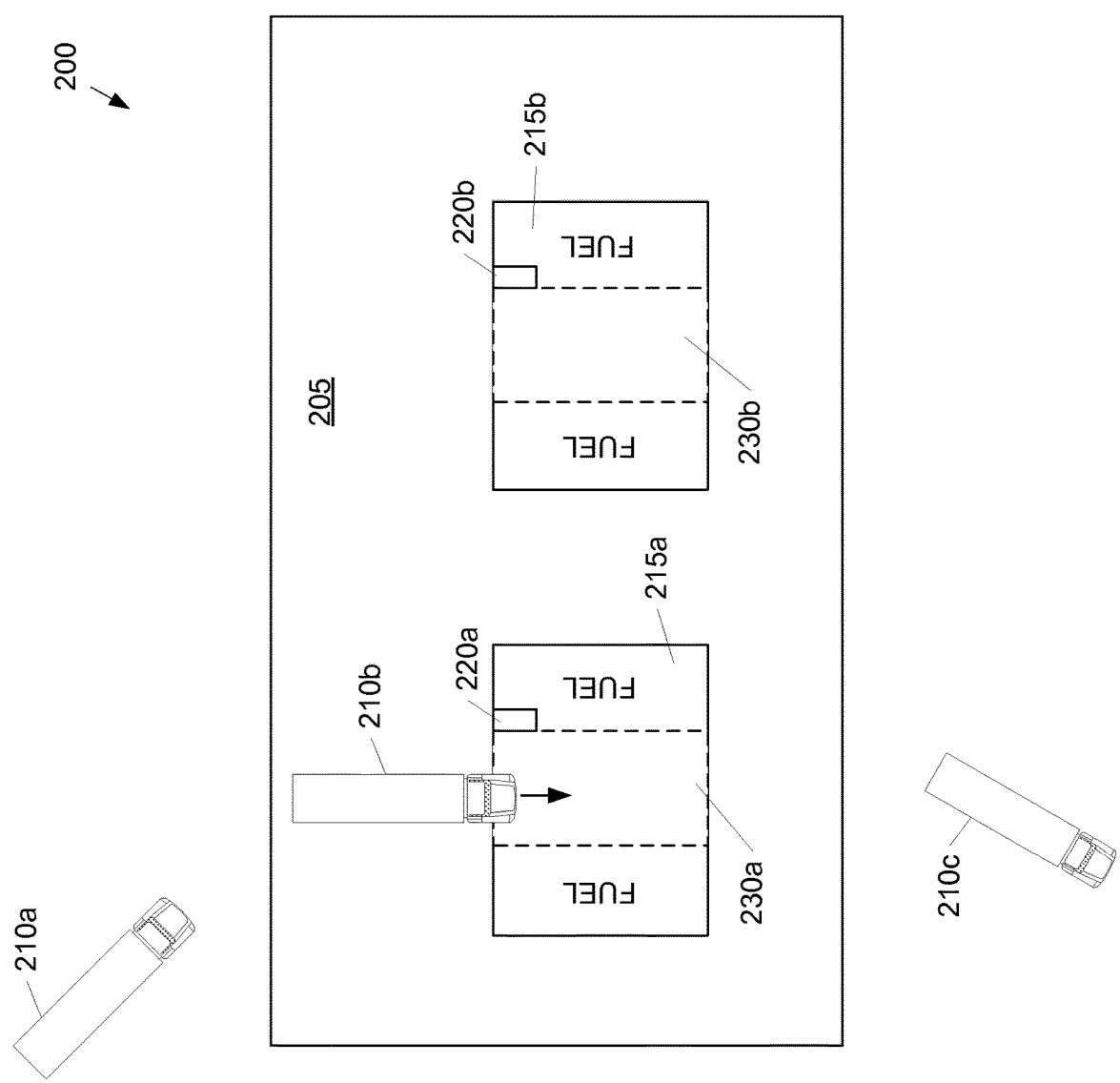
FIG. 2 illustrates a service station environment according to one or more aspects described herein.

FIG. 2 illustrates a service station environment 200 in which the entry and exit of vehicles from the station and predefined service areas thereof may be detected. Service station 205 may be a public unattended site or a site owned by the carrier itself, i.e., a terminal fuel site. Service station 205 may provide fueling services in addition to other driver and vehicle services. Service station 205 may comprise a plurality of fuel stations 215 which include short-range sensors 220. Fuel stations 215 may each have a primary fuel hose and nozzle on one side of a fuel lane as well as a satellite fuel hose and nozzle on an opposite side of the fuel lane, e.g., for refueling commercial vehicles with fuel tanks on both sides. The sensors 220 may be configured to detect the entry of a vehicle such as truck 210*b* into a sensor area 230 of fuel station 215 using sensor 220. If a vehicle exits the predefined service detection area, e.g., area 230*a*, fuel station 215*a* may automatically shut off. Data regarding the times of vehicle entry and exit and other transaction related information may be sent to a carrier information system 125 of a carrier organization to which the vehicle belongs or is otherwise associated.

A vehicle's arrival and presence within a predefined service area may be detected using various sensors, e.g., short-range sensors, and communication devices such as RFID readers and RFID tags, BLUETOOTH, short-range WiFi devices and the like. For example, a driver or a vehicle may include one or more RFID tags storing identification information. The RFID tags may be read by a reader once the tags are within a specified proximity such as within communication range of a reader. Accordingly, a service station may control transactions and the activation/deactivation of service systems based on whether the vehicle or driver is within the predefined service area. With respect to the system of FIG. 1, the short-range sensors 220 may be a RFID reader of the RFID system 115 capable of detecting the presence of a RFID tag within a predefined service area, such as an RFID tag, and reading and writing data to and from the RFID tag.

Prior to arriving at a service station, a driver may conveniently enter transaction information and any additional transaction information using the vehicle-based communication system such as communication device 145 located in the cab of the truck 210b or within proximity of the wireless device 140, the service station 205, a fuel station 220a, or the truck 210b. By enabling the user to enter transaction information using the communication device 145, the system 100 provides the driver with the convenience and flexibility of entering transaction information from within the vehicle such as a cab of a truck or within a certain proximity of the wireless device 140, the service station 205, a fuel station 220a, or the truck 210b. In other words, the driver may be able to provide transaction information without being required to exit the cab of the truck and without being required to be at a specific location, such as a point of sale 130, by using the communication device 145 to provide initial transaction information and any additional information. Furthermore, the communication device 145 may store the transaction information and automatically provide at least some of the requested transaction information.

Figure 3:
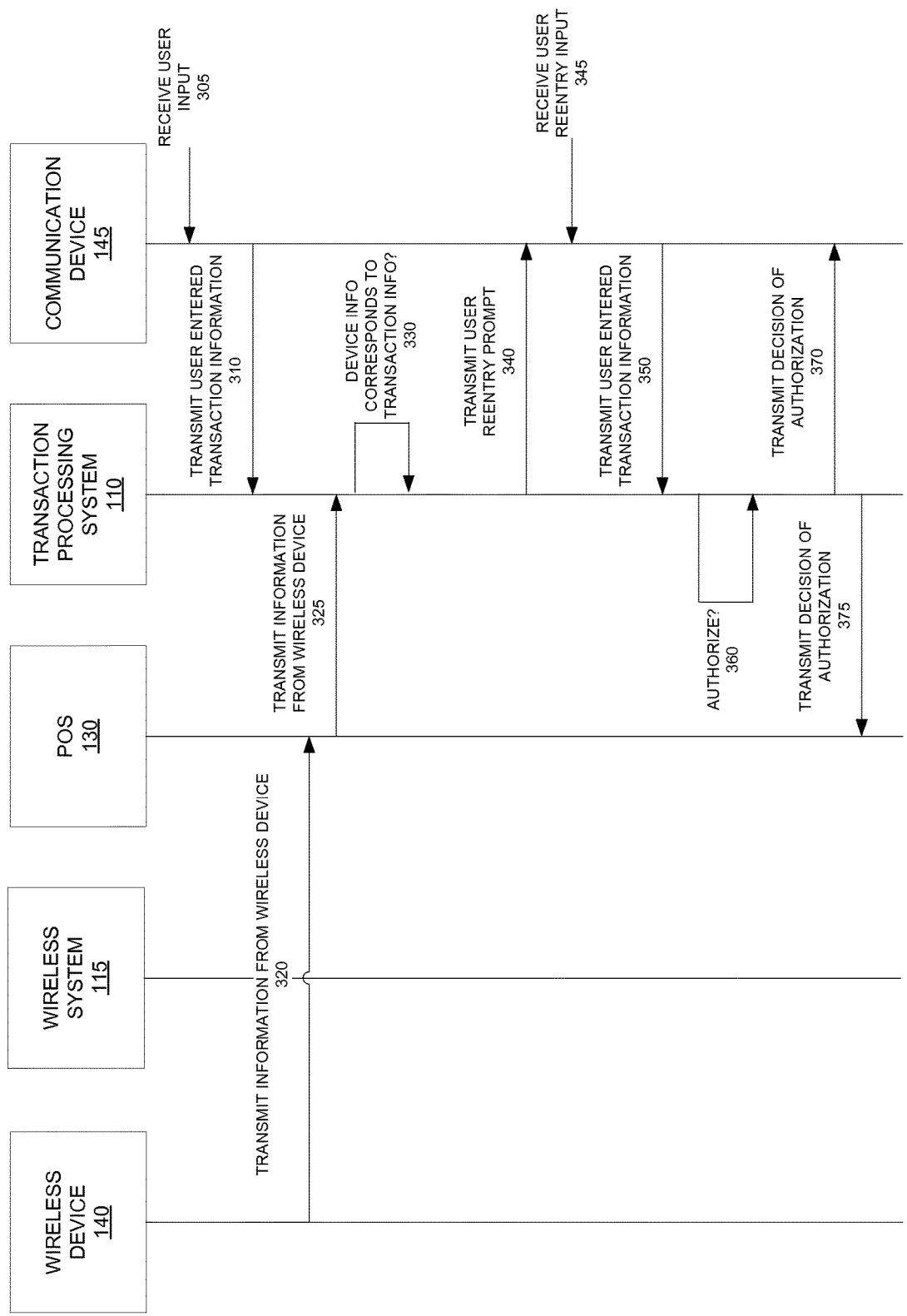
FIG. 3 is a process flow diagram illustrating a method for authorization and processing vehicle transaction requests according to one or more aspects described herein.

FIG. 3 is a process flow diagram showing communications between components of the system 100 with respect to an example of a method for processing a vehicle transaction request such as a fueling request.

At 305, the communication device 145 receives user input of the transaction information or user confirmation of pre-stored transaction information. The transaction information may include initial transaction information and any additional information, as entered by the driver via the vehicle-based or mobile communication device 145. By enabling the user to enter transaction information using the communication device 145, the system 100 provides the driver with the ability to enter transaction information from within the vehicle such as a cab of a truck or within a certain proximity, and potentially using a user interface (e.g. alphanumeric keyboard, large touch screen, etc.) more conducive to such data entry. In general, transaction information can include driver identification information, trip identification information, trailer identification information, truck identification information, license number, load identification information (e.g., dispatch number, load number, order number), loyalty card information, and payment information. For example, the driver may use communication device 145 to receive and communicate the information to the transaction processing system 110 and the point of sale system 130. The communication device may be any communication device capable of supporting wired or wireless communication with other devices or systems, e.g., a mobile device. Examples of communication devices include personal digital assistants (PDAs), mobile telephones, portable computers, tablets, and the like.

Because the communication device 145 may be used to provide the transaction information, the driver may be able to initiate a fueling transaction request without being required to exit the cab of the truck and without being required to be at a specific location such as a point of sale 130. In some examples, the driver may not need to be at the fueling station and may provide the transaction data from a remote location prior to entering the point of sale 130. Furthermore, the transaction information may also be pre-stored or previously entered into and stored in the communication device 145 for later use. For example, the communication device 145 may store the transaction information (e.g., prior to arriving at the fueling station) and automatically provide at least some of the stored transaction information when arriving at the fueling station. In some examples, the communication device 145 may automatically provide the transaction information from memory and/or based on location information. The driver may be able to confirm the pre-stored or previously entered transaction information and/or authorize the transmission thereof before the transaction information is transmitted. For example, different locations, routes, service stations, and/or fuel stations may result in different transaction information. Based on provided location information, the communication device 145 may determine which transaction information data stored on the communication device 145 is relevant for the transaction authorization request at service station 205 or fuel stations 205a. The location information may be location information provided by the wireless system 115 such as fuel station, fuel lane, and/or service station information or may be determined based on a GPS location or network connection of the communication device 145 such as base stations in the vicinity of the communication device and the signal strength of a communication link between the communication device and the base stations.

At 310, the communication device 145 transmits the inputted transaction information as part of a transaction authorization request to the transaction processing system 110. The communication device 145 may transmit the information over a network such as a wireless network to the transaction processing system 110. The wireless network may be a wireless wide area network (WAN), satellite communication network, cellular network and/or wireless Local Area Network (LAN) such as Wi-Fi.

The user may provide all or part of the driver or vehicle-side transaction information using the communication device 145, or the user may provide information which the carrier information system 125 of the transaction processing system 110 can use to supplement the transaction information. In some aspects, the user may provide transaction information such as initial transaction information using the communication device 145, and the communication device can transmit the entered information to the transaction processing system 110. The carrier information system 125 of the transaction processing system 110 may be able to determine from the received information the corresponding transaction information stored in the carrier information system 125. Additionally, the carrier information system 125 may be able to supplement the received transaction information. In some aspects, the carrier information system 125 can communicate the information stored in the carrier information system 125 to the transaction authorization system 120 or to the point of sale 130 (with or without use of the communication device 145).

Alternatively, a driver and/or truck 105 may initiate a transaction with a fuel station 215 automatically. For example, communication device 145 may automatically generate and issue a transaction request to the transaction processing system 110 with the transaction request including transaction data which may be pre-stored upon entering a wireless communication area serviced by service station 205 or fuel station 215. Station 205 may employ a wireless communication network having a limited range to allow trucks such as truck 210a and/or drivers to initiate various transactions once they are within the predefined range or proximity.

For example, the transaction information may also be pre-stored or previously entered into and stored in the communication device 145 for later use. The communication device 145 may automatically provide stored transaction information from memory and/or based on location information, e.g., upon the vehicle's entry in a wireless communication area. The driver may be able to confirm the pre-stored or previously entered transaction information before the transaction information is transmitted. For example, different locations, routes, service stations, and/or fuel stations may result in different transaction information. Based on location information, the communication device 145 may determine which transaction data stored on the communication device 145 is relevant for the transaction authorization request at service station 205 or fuel stations 205a, such as loyalty program identification.

The wireless system 115 may detect a vehicle's entry into a predefined wireless service area associated with a particular fuel and/or service station, such as a fuel zone. For example, a RFID reader of a wireless system 115 or sensor 220a may detect the entry of truck 210b into sensor area 230a of fuel station 215a. The truck 210b may include a wireless device 140, e.g., a RFID tag, and a communication device 145. In response to detecting entry of the truck 210b into the wireless service area, RFID reader of the wireless system 115 may read the information from a wireless device 140 or RFID tag. At 320, information from the wireless device 140 and/or location information (e.g., fuel station, fuel lane, service station) is transmitted to the point of sale 130 via the wireless system 115. The wireless system 115 may also alert the point of sale 130 of the arrival of a vehicle with a wireless device and provide the point of sale 130 with information associated with the vehicle or the wireless device such as an identification number or serial number.

At 325, the point of sale 130 transmits the information from the wireless device 140 as well as other service station data to the transaction processing system 110. Next, the transaction processing system 110 performs a transaction authorization process, which may include determining if the information from the wireless device 140 corresponds to transaction information at 330 and determining whether to authorize the transaction at 360. In one example, the transaction processing system 110 may determine whether the transaction information corresponds to information from the wireless device at 330. Determining whether the transaction information corresponds to information from the wireless device at 330 is included as a part of the transaction authorization process to verify that the transaction processing system 110 has all required information for a fueling transaction request that corresponds to the vehicle detected at the service station. For example, the transaction processing system 110 may receive some information from the wireless device 140, such as a truck identification number, a trailer identification number, and the like. The transaction processing system 110 may then determine if there is corresponding transaction information from the communication device 145, e.g., transaction information with a matching truck identification number, which has additional information for the fueling transaction, such as a driver identification number, payment information, loyalty card information, and the like.

If the location information from the wireless device 140 does not correspond to any of the received transaction information, the transaction processing system 110 may transmit a prompt to the communication device 145 for user reentry of transaction information at 340. Alternatively, if data is missing, the transaction processing system 110 may request additional information from the device 145/user. Request(s) for additional transaction information may follow in a subsequent prompt(s) to the driver via the communication device 145. If no data is entered in response to the re-entry request, the transaction processing system 110 system may wait a predetermined time to resend a data reentry prompt or to send a notification to the point of sale 130. At 345, the communication device 145 may receive reentered user input of the transaction information following the reentry prompt at 340 and the communication device 145 may transmit the reentered input transaction information to the transaction processing system 110 at 350.

Additionally or alternatively, the process of authorization in step 360 may include a variety of steps including authenticating the requestor as an authorized user, verifying the identification information of the driver requesting transaction authorization, and determining whether an identified carrier associated with the requestor has sufficient funds to pay for the transaction. Authorization may also relate to determining whether the requestor is authorized by his or her carrier to make purchases or receive cash advances of above a certain amount of money and/or at a particular service station or location which may be determined based on the location information. For example, a carrier may restrict its drivers to purchases at a single station of $40 or less (not including fuel) and/or at a service station in a certain geographic area. Accordingly, a transaction request for purchasing $50 worth of specified products would be determined to be unauthorized by the carrier, and a transaction request for a service station outside of a certain geographic location would be denied. Additionally, a carrier may restrict transactions to a predetermined list of service stations, and the transaction request for a particular service station may be determined by the location information included in the transaction request. For example, the location information such as a fuel station, fuel lane, service station identifier, or geographic location (e.g., GPS-determined location) can be used to determine whether the transaction request is originating from an approved service station and for an approved service station.

The identification information of a requestor (e.g., a requesting truck and/or driver) transmitted via the transaction request(s) may be verified as part of the process of authorization in step 360. One method of validating the identification information provided in the transmission request(s) is by confirming the information with a transaction processing system 110 or with a carrier information system 125. Identification information may include a smart card driver's license information, biometric data (fingerprints, retina scan, etc.), and vehicle information (truck serial number, truck identification number, load information, etc.). Identification information may be stored at the fuel authorization system, within the communication device 145, or in other devices capable of communicating with devices of the vehicle based communication system such as other RFID tags, NFC cards, or smart cards.

A carrier or carrier information system associated with the requestor may be determined from the information included in the transmission request(s). For example, as part of the transaction request, the requestor may explicitly identify a carrier or carrier information system for validating the request information. Alternatively or additionally, a transaction processing system or fuel station may have an internal database associating a truck, driver and/or truck-mounted device ID with a carrier. The internal database may further identify the address and/or contact information corresponding to the carrier based on a priori knowledge, e.g., provided during an initial registration process or sign-up procedure. In one or more arrangements, the internal database may further be used to verify that carrier information received from a requestor does indeed correspond to the requestor's ID prior to validation with the carrier information system.

Although FIG. 3 illustrates determining whether wireless device information corresponds to the communication device provided transaction information, this process may be performed as part of the authorization process. Accordingly, other authorization parameters or factors may be evaluated ahead of, in conjunction with and/or after determining whether the wireless device information and the transaction information correspond (e.g., match).

After the transaction processing system 110 has determined whether the transaction request is authorized, a decision of authorization is transmitted to the communication device at 370 and/or to the point of sale 130 at 375. For example, if the transaction is authorized, the transaction processing system 110 may transmit an authorization indication to the point of sale 130 and/or the communication device 145. If the transaction authorization is denied, the transaction processing system 110 may determine whether the cause of the denial is a data error. If a data error is not present in the transaction information, the transaction processing system 110 may transmit a denial message indicating denial of authorization to the communication device 145 and/or the point of sale 130. Alternatively, if the transaction processing system 110 determines that a data error is present, the transaction processing system 110 may transmit a prompt to the communication device requesting reentry the transaction information. For example, the transaction processing system 110 may determine that the entered transaction information does not match a known format for the information (e.g., alphanumeric format) or that a typographical error is present in the transaction information.

Figure 4:
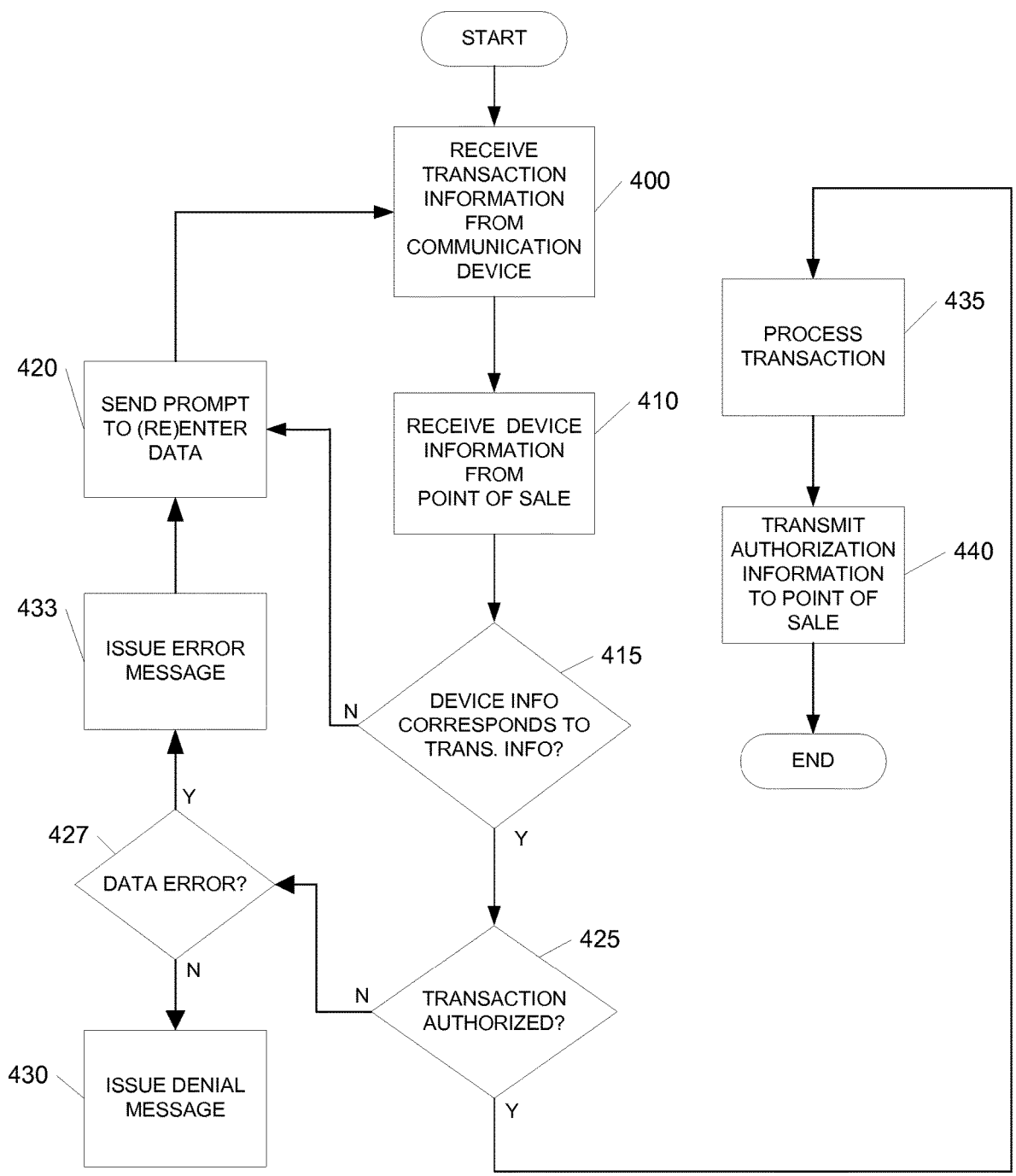
FIG. 4 is a flowchart of the method illustrated in FIG. 3, according to the transaction processing system.

FIG. 4 is a flowchart illustrating the method of FIG. 3 for the transaction processing system.

In step 400, the transaction processing system 110 receives user-entered or stored transaction information for a fueling transaction from the communication device 145. The received transaction information may be part of a transaction authorization request. In step 410, upon detection of a vehicle's entry into a predefined wireless service area and the service station reading the information from the wireless device, the transaction processing system 110 receives information from the wireless device 140 via the point of sale 130. The predefined wireless service area may be associated with a particular fuel and/or service station, such as a fuel zone. RFID reader 220a of the wireless system 115 may also transmit location information (e.g., fuel station, fuel lane, service station) to the transaction processing system 110 based on the location of the wireless device 140 detected by the RFID reader 220a. In response to receiving the information from the wireless device, the transaction processing system 110 may verify that the fuel station 215a is an authorized location. In some arrangements, the user-entered or stored transaction information may include a trigger for the transaction processing system 110 to request service station data from the point of sale 130 or other service station system.

In step 415, after receiving the information obtained from the wireless device by the point of sale 130, the transaction processing system 110 determines if the information from the wireless device 140 corresponds to transaction information transmitted from step 415, e.g., transaction information associated with data input from communication device 145. Determining if the information from the wireless device 140 corresponds to transaction information from the communication device may include, for example, verifying that the user or vehicle identification provided in the transaction information corresponds to, or matches, the vehicle detected at the service station (e.g., based on the identification obtained from the wireless device). In one example, a common identifier is included in both the information from the wireless device and information from the communication device, e.g., a driver identification number, a vehicle identification number, a trip identification number, or the like, and the transaction processing system 110 matches the common identifier in step 415.

If the transaction processing system 110 determines that there is no stored transaction information corresponding to the information from the wireless device 140, if there are missing components of the transaction information, or the transaction information is otherwise deficient (e.g., an information component has expired), the transaction processing system 110 may, at step 420, send a prompt to the communication device requesting reentry of input data, e.g., to allow for the correction of errors when inputting the transaction information. If the transaction processing system 110 does not receive transaction information for a predetermined amount of time, it may resend a prompt for reentry of transaction information and/or transmit notification to the point of sale 130.

The transaction processing system 110 determines if transaction request is authorized at step 425. If a determination is made that the transaction is unauthorized, the transaction processing system 110 may, at step 427, determine whether the denial of the transaction was a result of a data error. For example, the transaction processing system 110 may determine that the entered transaction information does not match a known format for the information (e.g., alphanumeric format) or that a typographical error is present in the transaction information. If in step 427, the system 110 determines that the denial was a result of a data error, the system 110 may issue an error message at step 433 and send a prompt or request for a reentry of transaction information data at step 420. The process may return to step 400 in which the transaction processing system 110 receives user-entered transaction information as discussed herein.

If in step 427, the transaction processing system 110 determines that the denial was not a result of a data error, a denial indication or message may be transmitted to the requestor via the communication device 145 and/or the point of sale 130 in step 430. Alternatively or additionally, a message confirming the information transmitted may be sent to the requestor to provide another validation opportunity, for example, using the communication device 145 or another device such as the point of sale 130. The denial message may be transmitted to the communication device 145 from the transaction processing system 110 through a wireless network or through another communication interface of the communication device 145.

If the transaction is authorized in step 425, the transaction processing system 110 may process the transaction by processing payment authorization for the transaction in step 435 and transmit a transaction authorization indication to the point of sale 130 in step 440. Alternatively, the transaction processing system 110 may transmit an indication that the transaction is authorized to the point of sale 130, and the point of sale 130 may process the payment authorization for the transaction.

Figure 5:
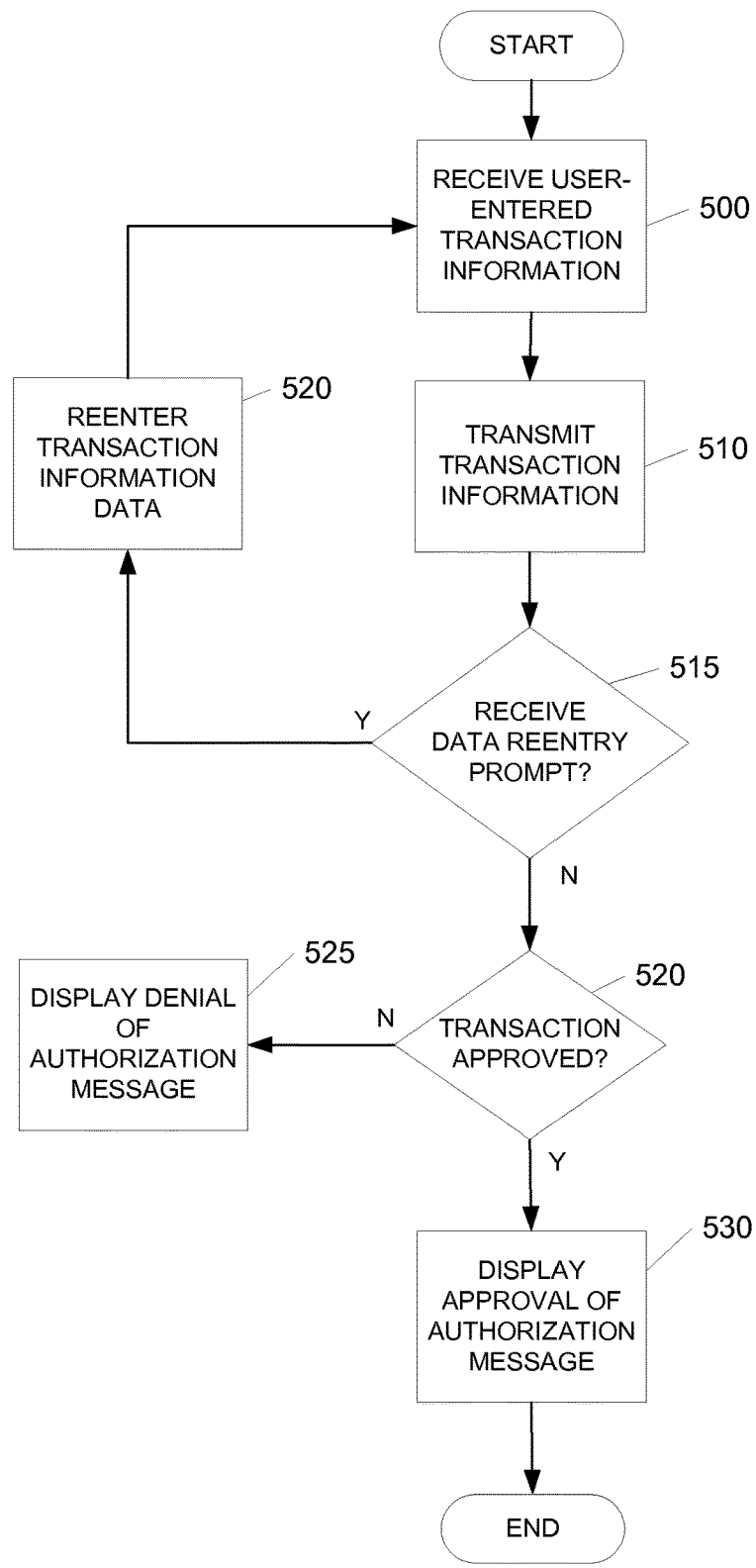
FIG. 5 is a flowchart of the method illustrated in FIG. 3, according to the communication device.

FIG. 5 is a flowchart illustrating the method of FIG. 3 for the communication device.

In step 500, the communication device 145 receives user-entered transaction information for a fueling transaction. In step 510, the communication device 145 transmits the entered or provided initial transaction information and any additional stored transaction information to the transaction processing system 110. The transaction information may be transmitted as part of a transaction authorization request.

The communication device may, in step 515, receive a prompt to the communication device requesting reentry of input data, e.g., to allow for the correction of errors when inputting the transaction information, if the transaction processing system 110 has determined that the transaction information does not correspond to information received from a wireless device 140. The process may then return to step 500 in which the communication device 145 receives user-entered transaction information as discussed herein.

In step 520, the communication device 145 determines if the transaction is approved based on receiving an authorization decision from the transaction processing system 110. If the transaction is not approved, the communication device 145 displays a denial of authorization message at step 525. In some examples, the denial of the transaction may be determined to be a result of a data error and the communication device 145 may subsequently display an error message and provide a prompt or request for a reentry of transaction information data (not shown). In one or more instances, a denial message may include an opportunity for the requestor to revise his transaction request and/or related information. The denial message may be presented on the screen of the communication device 145. Alternatively or additionally, a message confirming the information transmitted may be sent to the requestor to provide another validation opportunity using the communication device 145. An option of canceling the transaction authorization request may also be presented on the screen of the communication device 145.

If the transaction is approved, the communication device 145 displays an approval of authorization message at step 530. In some examples, the transaction processing system 110 may transmit an activation code to the communication device 145 to be entered at the point of sale 130 in order to complete approval of the transaction. Once the transaction is completed, the completed transaction information may be transmitted to the communication device 145 through a wireless network from the point of sale 130.

Figure 6:
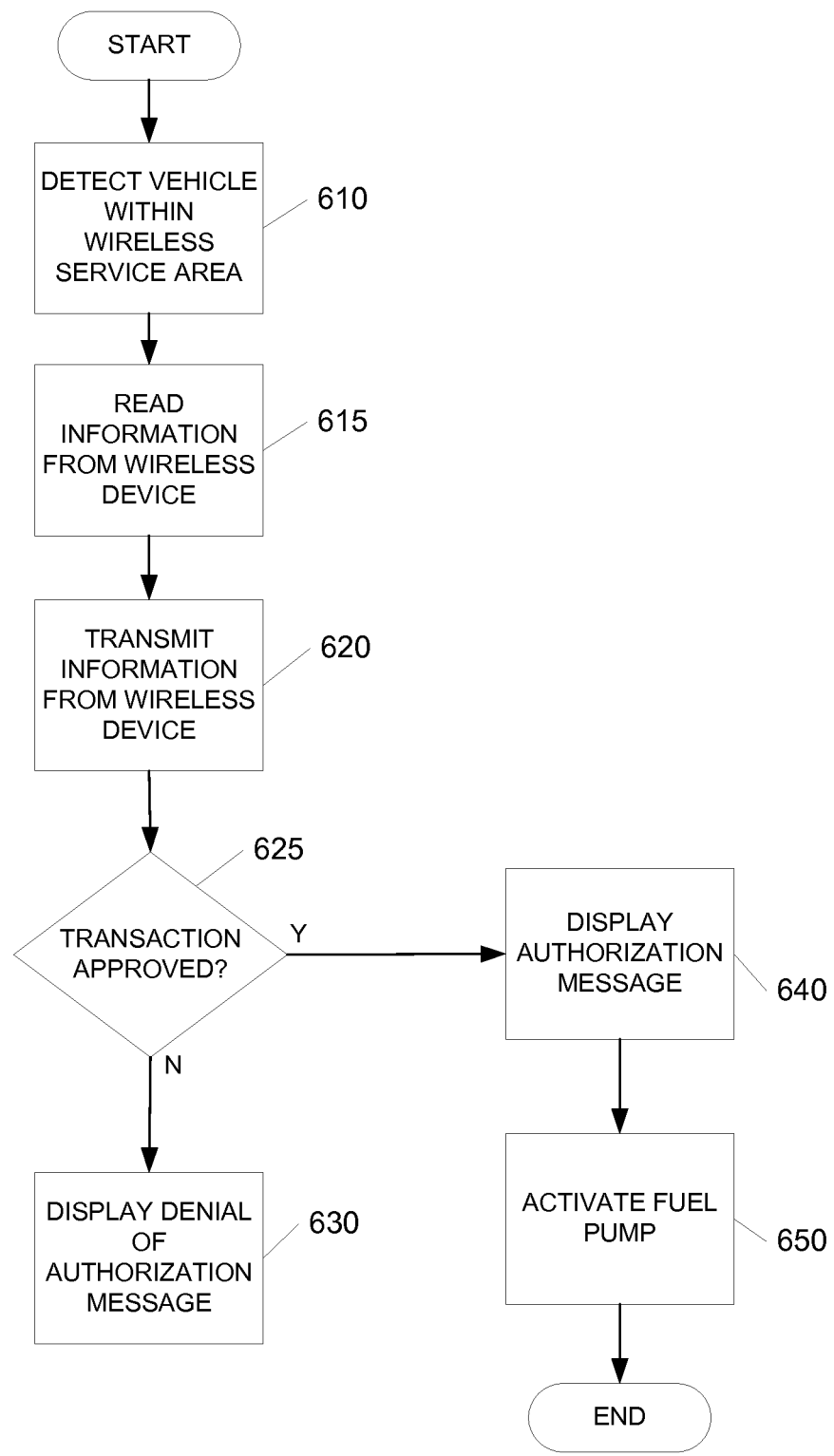
FIG. 6 is a flowchart of the method illustrated in FIG. 3, according to the point of sale.

FIG. 6 is a flowchart illustrating the method of FIG. 3 for the point of sale.

In step 610, a vehicle's entry into a predefined wireless service area associated with a particular fuel and/or service station, such as a fuel zone, may be detected by the point of sale 130. In response to detecting the presence of the vehicle in the predefined wireless service area, at step 615, the information from the wireless device is read and transmitted by the wireless system 115 to the point of sale 130. In step 620, the information from the wireless device 140 and/or service station information such as location data (e.g., fuel station, fuel lane, service station) is transmitted to the transaction processing system 110 to provide adequate sufficient authorization parameters. The wireless system 115 may also alert the point of sale 130 of the arrival of a vehicle with a wireless device and provide the point of sale 130 with information associated with the vehicle or the wireless device such as an identification number or serial number.

In step 625, the point of sale determines if the transaction is approved based on receiving an authorization decision from the transaction processing system 110. If the transaction is not approved, the point of sale 130 displays a denial of authorization message at step 630. Additionally, a message confirming the information transmitted may be sent to the requestor to provide another validation opportunity, for example, using the point of sale 130.

If the transaction is approved, the point of sale 130 displays an approval of authorization message at step 640. The point of sale 130 may receive a transaction authorization indication with the payment processed by the transaction processing system 110. Alternatively, the transaction processing system 110 may transmit an indication that the transaction is authorized to the point of sale 130, and the point of sale 130 may process the payment authorization for the transaction. In some examples, the transaction processing system 110 may transmit an activation code to the communication device 145 to be entered at the point of sale 130 in order to complete approval of the transaction.

In step 650, the point of sale 130 activates the fuel station or pump indicated in the location information determined by the wireless system 115 to enable dispensing of fuel for the truck 210*b* in response to receiving authorization or approval of the transaction. The point of sale 130 may activate the fuel dispenser to dispense an authorized amount of fuel. In some examples, the point of sale 130 may activate the fuel dispenser to dispense fuel from both a primary fuel nozzle on one side of a fuel lane and a satellite fuel nozzle on an opposite side of the fuel lane. The point of sale 130 may also communicate a confirmation of the transaction authorization to the communication device 145 through the RFID system 115. Once the transaction is completed, the completed transaction information may be transmitted to the communication device 145 through a wireless network from the point of sale 130.

While the methods and systems described herein have related, in greater part, to fueling transactions and fuel dispensation systems, one of skill in the art will appreciate that the methods and system may be applied to any of a number of transaction types and service systems where the user is required to provide or enter data at a specific location.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

While illustrative systems and methods described herein embodying various aspects are shown, it will be understood by those skilled in the art that the disclosure is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
    receiving, by a fueling transaction system, transaction information for a fueling transaction while a vehicle is outside of a predefined wireless service area of a service station, the transaction information including user input data from a communication device in the vehicle, wherein the user input data includes a first set of vehicle and fuel stop identification information;
    receiving, by the transaction system, a second set vehicle and fuel stop identification information from a wireless device associated with at least one of a driver of the vehicle and the vehicle through a fuel pump system of the service station in response to detecting the wireless device in the predefined wireless service area of the service station;
    upon detecting the vehicle entering the predefined wireless service area, determining a location of the vehicle in the predefined wireless service area using location information obtained from a vehicle sensor by an electronic reader located at the service station;
    upon receiving the second set of vehicle and fuel stop identification information from the wireless device through the fuel pump system:
        determining, by the transaction system, if vehicle identification information of the second set of vehicle and fuel stop identification information matches vehicle identification information of the first set of vehicle and fuel stop identification information of the transaction information;
    determining, by the transaction system, authorization of the fueling transaction based on the vehicle identification information of the second set of vehicle and fuel stop identification information matching the vehicle identification information of the first set of vehicle and fuel stop identification information; and
    transmitting, to the service station, a transaction authorization indication from the transaction system responsive to determining authorization of the fueling transaction,
    wherein the service station is configured to activate a fuel dispenser system to dispense fuel into the vehicle upon receiving the transaction authorization indication from the transaction system.

2. The method of claim 1, wherein the input data includes at least one of: driver identification number, trip identification number, truck identification number, license number, load identification number, loyalty card information, odometer reading, trip number or trailer identification number, and payment information.

3. The method of claim 1, wherein the input data includes a plurality of inputs and the communication device is configured to store one or more of the plurality of inputs.

4. The method of claim 3, wherein the one or more stored inputs include one or more driver-related loyalty identifications, each driver-related loyalty identification corresponding to a loyalty program associated with one or more service station.

5. The method of claim 1, further comprising transmitting a data input entry prompt to the communication device upon determining a transaction information component is missing or includes an error, the data input reentry prompt including a request for entry of the transaction information component.

6. The method of claim 1, wherein determining authorization of the fueling transaction based on the transaction information includes determining whether the service station is an authorized service station.

7. The method of claim 1, wherein the communication device is selected from one of a personal digital assistant, a mobile telephone, a portable computer, and a tablet.

8. The method of claim 1, wherein the communication device is installed in the vehicle.

9. The method of claim 1, further comprising transmitting a prompt to the communication device if no input data is received for a predetermined time after receiving fuel stop information.

10. The method of claim 1, further comprising transmitting an error message to the communication device in response to determining the fueling transaction is not authorized.

11. The method of claim 10, further comprising transmitting a data input reentry prompt to the communication device, the data input reentry prompt including a request for reentry of input data.

12. The method of claim 1, wherein the wireless device comprises a radio frequency identification (RFID) tag.

13. The method of claim 1, further comprising transmitting an error message to the communication device in response to determining that the second set of vehicle and fuel stop identification information does not match the first set of vehicle and fuel stop identification information.

14. A system comprising:
    a near range wireless device associated with a vehicle, the wireless device being configured to wirelessly transmit information to a service station upon entering a predefined wireless area of the service station;
    a near range wireless detection system configured to detect the wireless device entering the predefined wireless area causing the service station to read information from the wireless device and to send a first set of vehicle and fuel stop identification information, through a fuel pump system of the service station, to a transaction system in response to reading information from the wireless device; and
    a long range communication device configured to wirelessly transmit transaction information to the transaction system while the vehicle is outside of the predefined wireless area of the service station, the transaction information including user input data for a fueling transaction request, wherein the user input data includes a second set of vehicle and fuel stop identification information;
    wherein the transaction system is configured to:

upon detecting the wireless device entering the predefined wireless area, determine a location of the vehicle in the predefined wireless area using location information obtained from the near range wireless device by the near range wireless detection system;

upon receiving the second vehicle and fuel stop identification information sent from the wireless device through the fuel pump system, determine if vehicle identification information of the second set of vehicle and fuel stop identification information sent matches vehicle identification information of the first set of vehicle and fuel stop identification information received from the long range communication device;

determine if a fueling transaction is authorized based on whether the vehicle identification information of the second set of vehicle and fuel stop identification information matches the vehicle identification information of the first set of vehicle and fuel stop identification information; and transmit a transaction authorization to the service station upon determining the fueling transaction is authorized, and wherein the service station is configured to activate a fuel dispenser of the fuel pump system to dispense fuel into the vehicle upon receiving the transaction authorization from the transaction system.

15. The system of claim 14, wherein the communication device is configured to store at least a portion of the input data for a predetermined amount of time.

16. The system of claim 14, wherein the input data includes at least one of: driver identification number, trip identification number, truck identification number, license number, load identification number, loyalty card information, odometer reading, trip number or trailer identification number, and payment information.

* * * * *